US010373784B2

(12) United States Patent
Choi et al.

(10) Patent No.: US 10,373,784 B2
(45) Date of Patent: Aug. 6, 2019

(54) SUPERCONDUCTING DC CIRCUIT BREAKER USING ARCING INDUCTION

(71) Applicant: Industry-Academic Cooperation Foundation, Chosun University, Gwangju (KR)

(72) Inventors: Hyo-Sang Choi, Gwangju (KR); Sang-Yong Park, Gwangju (KR); In-Sung Jeong, Gwangju (KR); Hye-Won Choi, Gwangju (KR); Jun-Beom Kim, Gwangju (KR); Yu-Kyeong Lee, Gwangju (KR); No-A Park, Gwangju (KR); Sun-Ho Hwang, Jeollanam-do (KR)

(73) Assignee: INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 328 days.

(21) Appl. No.: 15/499,516

(22) Filed: Apr. 27, 2017

(65) Prior Publication Data

US 2017/0316894 A1 Nov. 2, 2017

(30) Foreign Application Priority Data

Apr. 29, 2016 (KR) ........................ 10-2016-0052962
Apr. 29, 2016 (KR) ........................ 10-2016-0052966

(51) Int. Cl.
*H01H 33/12* (2006.01)
*H02H 7/00* (2006.01)
(Continued)

(52) U.S. Cl.
CPC .......... *H01H 33/12* (2013.01); *H01H 33/004* (2013.01); *H02H 7/001* (2013.01);
(Continued)

(58) Field of Classification Search
USPC ........................................................... 361/19
See application file for complete search history.

(56) References Cited

U.S. PATENT DOCUMENTS

2015/0236502 A1* 8/2015 Xu ........................ H02H 9/023 361/93.9
2016/0190791 A1* 6/2016 Sim ......................... H02H 3/06 361/93.6

FOREIGN PATENT DOCUMENTS

JP 59105228 A 6/1984
JP 03116640 U1 12/1991
(Continued)

OTHER PUBLICATIONS

Patent Abstract (in English) of WIPO Patent App. Pub. No. 2013164875 A1, Pub. Date Nov. 7, 2013, downloaded Apr. 4, 2018 from https://worldwide.espacenet.com.
(Continued)

*Primary Examiner* — Danny Nguyen
(74) *Attorney, Agent, or Firm* — Barcelo, Harrison & Walker, LLP

(57) ABSTRACT

A superconducting arcing induction type DC circuit breaker includes a superconducting fault current limiter and an arcing induction type DC circuit breaker connected in series to each other. The arcing induction type DC circuit breaker includes an induction member that has a through-hole, is continuously formed in a 360-degree direction, and has a certain shape and thickness, and an induction needle that protrudes from an inner surface of the induction member toward a center of the induction member. A contact point where an anode and a cathode, which are mechanical contacts, approach from opposite directions and come into contact with each other is formed in the through-hole of the induction member, and the anode and the cathode are separated in a direction far away from each other. The
(Continued)

induction needle induces arc generated upon contact opening when the anode and the cathode are separated from each other in the event of system accident of DC power or AC power, and the induction member quenches the induced arc by the flow of the induced arc to ground through a ground line.

6 Claims, 10 Drawing Sheets

(51) Int. Cl.

| | |
|---|---|
| ***H01H 33/00*** | (2006.01) |
| *H02H 9/02* | (2006.01) |
| *H01H 33/59* | (2006.01) |

(52) U.S. Cl.

CPC .......... *H01H 33/596* (2013.01); *H02H 9/023* (2013.01); *Y02E 40/68* (2013.01); *Y02E 40/69* (2013.01)

(56) References Cited

FOREIGN PATENT DOCUMENTS

| | | |
|---|---|---|
| JP | 2000048686 A | 2/2000 |
| JP | 2004014239 A | 1/2004 |
| JP | 2005222705 A | 8/2005 |
| WO | WO2013164875 A1 | 11/2013 |

OTHER PUBLICATIONS

International Search Report from Japanese Patent Office of Int. App. No. PCT/JP2012/061531, dated Jul. 10, 2012.

Japanese Patent Search Results (in English) of Japanese Patent Pub. No. 03116640 U1, Pub. Date Dec. 3, 1991, downloaded Apr. 9, 2018 from https://www4.j-platpat.inpit.go.jp/eng/.

Japanese Patent Search Results (in English) of Japanese Patent Pub. No. 59105228 A, Pub. Date Jun. 18, 1984, downloaded Apr. 9, 2018 from https://www4.j-platpat.inpit.go.jp/eng/.

Japanese Patent Abstract (in English) of Japanese Patent Pub. No. 2000048686 A, Pub. Date Feb. 18, 2000, downloaded Apr. 11, 2018 from https://www4.j-platpat.inpit.go.jp./eng/.

Japanese Patent Abstract (in English) of Japanese Patent Pub. No. 2004014239 A, Pub. Date Jan. 15, 2004, downloaded Apr. 11, 2018 from https://www4.j-platpat.inpit.go.jp./eng/.

Japanese Patent Abstract (in English) of Japanese Patent Pub. No. 2005222705 A, Pub. Date Aug. 18, 2005, downloaded Apr. 11, 2018 from https://www4.j-platpat.inpit.go.jp/eng/.

Korean Office Action for Korean Patent App. No. 10-2016-0052962 A, Pub. Date Apr. 29, 2016, dated May 30, 2017.

Korean Office Action for Korean Patent App. No. 10-2016-0052966 A, Pub. Date Apr. 29, 2016, dated May 30, 2017.

* cited by examiner

SUPERCONDUCTING DC CIRCUIT BREAKER USING ARCING INDUCTION

CROSS-REFERENCE TO RELATED APPLICATIONS

This application claims the benefit of Korean Patent Application Nos. 10-2016-0052962 and 10-2016-0052966, both filed on Apr. 29, 2016, in the Korean Intellectual Property Office, the disclosures of which are incorporated herein in their entirety by reference for all purposes.

BACKGROUND

1. Field of the Invention

The present invention relates to a superconducting arcing induction type DC circuit breaker, and more particularly, to a superconducting arcing induction type DC circuit breaker, which limits most fault current within a half period by a superconducting fault current limiter, induces arc to an induction needle upon contact opening of an arcing induction type DC circuit breaker, and quenches the induced arc by the flow of the induced arc to a ground line through an induction ring, thereby preventing occurrence of an accident caused by generation of a fault current.

2. Description of Related Art

With the development of distributed power based on new renewable energy source such as photovoltaic power generation and fuel cell power generation, DC distribution systems attract attention. As new renewable energy including photovoltaic power generation is developing, DC type power generation becomes widely spread. Thus, interest in DC distribution networks is rising.

The greatest advantage of DC distribution is a reduction in costs and power loss without a power conversion process when the DC distribution is applied to equipment requiring DC power.

In order to apply a DC distribution system to a system, research into system protection technology as well as research into the use of DC power is required.

In order for rapid spread of DC systems, it is essential to develop DC circuit breaker technology that is main protection technology for securing stability and high reliability.

One of factors causing problems in DC technology is arc quenching. Unlike an AC circuit breaker, a DC circuit breaker has no zero point, and a contact of the DC circuit breaker is opened in the event of accidents. At this time, arc may be generated by a high switching surge voltage.

Thus, the arc generated at DC has a long quenching time and locally generates high-temperature heat on the same principle of arc welding. This may result in a fire as well as damage to electrodes.

Also, as compared with AC, DC appears with significantly great instantaneous inrush current even upon conduction. Thus, a load device requires inrush current protection. However, no inrush current limitation regulation for DC products is established. Therefore, there is an urgent need for an additional technical method and an efficient quenching method capable of suppressing DC arc.

SUMMARY OF INVENTION

One or more embodiments of the present invention include a superconducting arcing induction type DC circuit breaker, which limits most fault current through a quenching operation of a superconducting fault current limiter, induces arc to an induction needle upon contact opening of an arcing induction type DC circuit breaker, and quenches the induced arc by the flow of the induced arc to a ground line through an induction ring, thereby preventing occurrence of an accident caused by generation of a fault current.

According to one or more embodiments of the present invention, a superconducting arcing induction type DC circuit breaker includes: a superconducting fault current limiter configured to perform a quenching operation at a speed of a half period or less in the event of line accident; and an arcing induction type DC circuit breaker including an induction member that has a through-hole, is continuously formed in a 360-degree direction, has a certain shape and thickness, and is made of a conductor material, and an induction needle that protrudes from an inner surface of the induction member toward a center of the induction member, wherein a contact point where an anode and a cathode, which are mechanical contacts, approach from opposite directions and come into contact with each other is formed in the through-hole of the induction member and the anode and the cathode are separated in a direction far away from each other, the induction needle induces arc generated upon contact opening when the anode and the cathode are separated from each other in the event of system accident of DC power or AC power, and the induction member quenches the induced arc by the flow of the induced arc to ground through a ground line.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It will be understood that the terms “comprises”, “includes”, and “has”, when used herein, specify the presence of stated elements, but do not preclude the presence or addition of other elements, unless otherwise defined.

Figure 1:
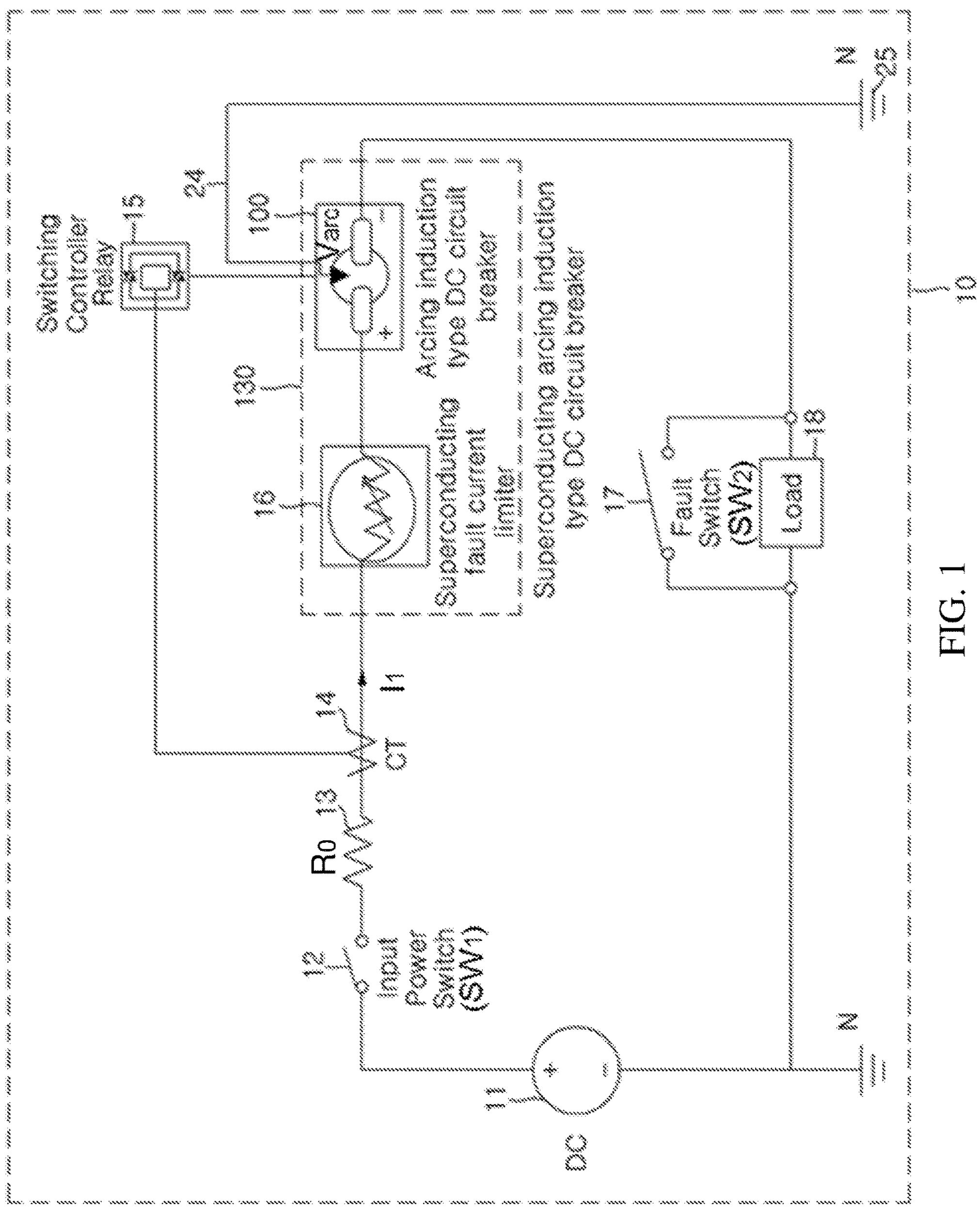
FIG. 1 is a schematic circuit diagram of a superconducting arcing induction type DC circuit breaker system according to an embodiment of the present invention.
Figure 2A:
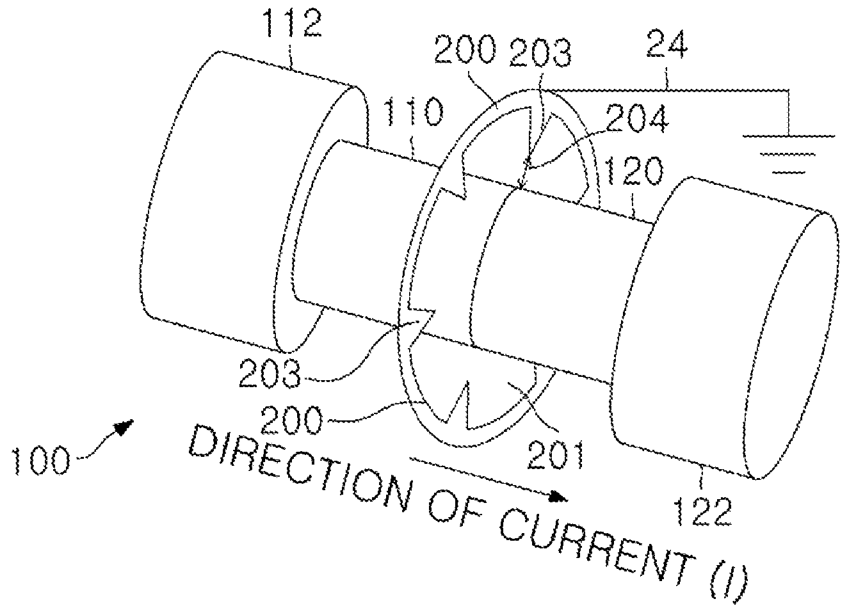
FIGS. 2A to 2D are diagrams of an arcing induction type DC circuit breaker according to an embodiment of the present invention.
Figure 2B:
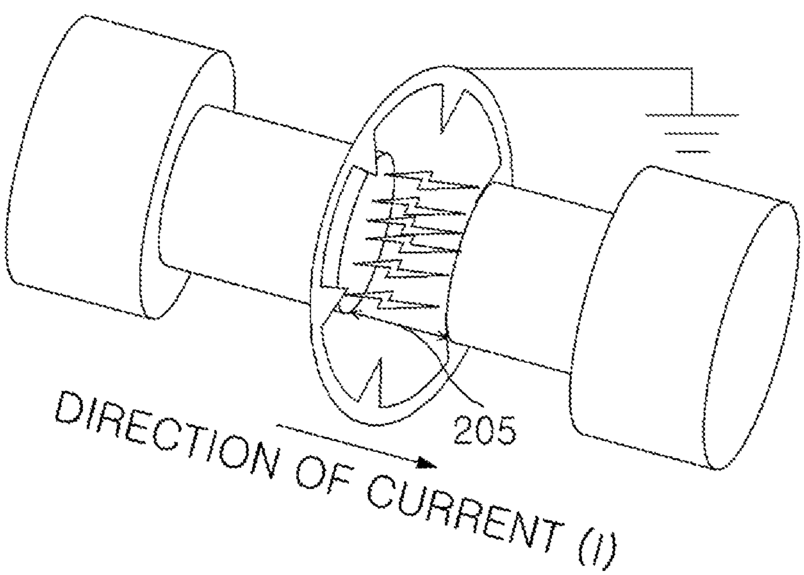
Figure 2C:
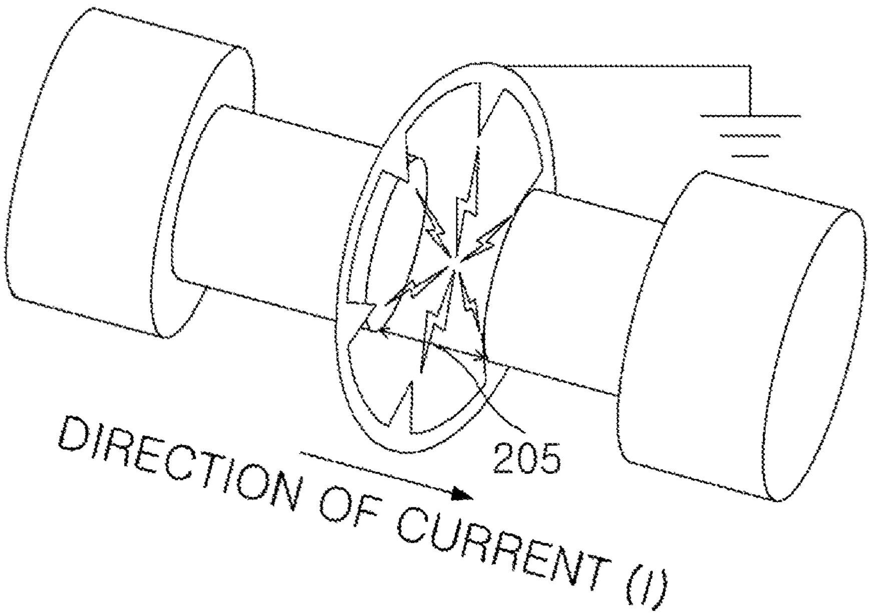
Figure 2D:
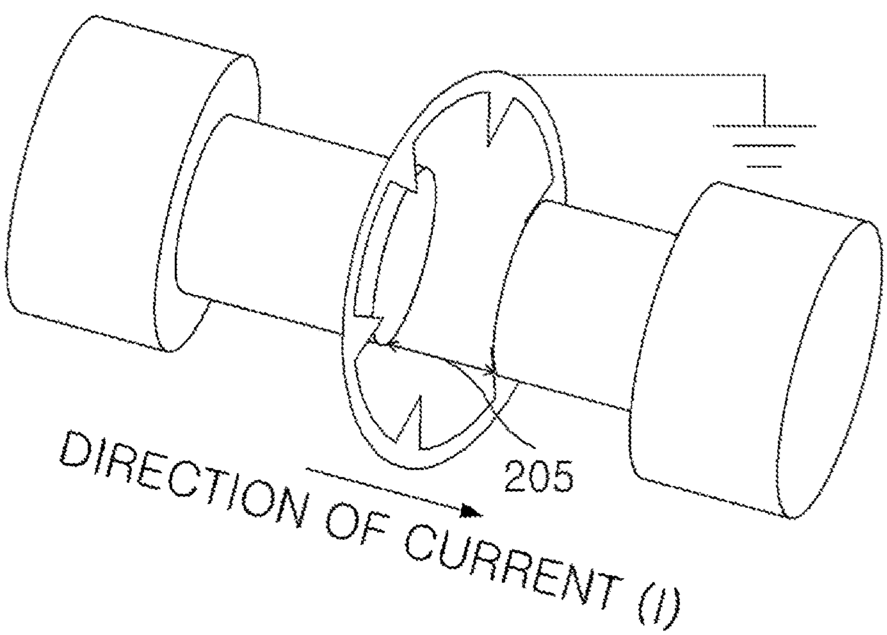
Figure 3:
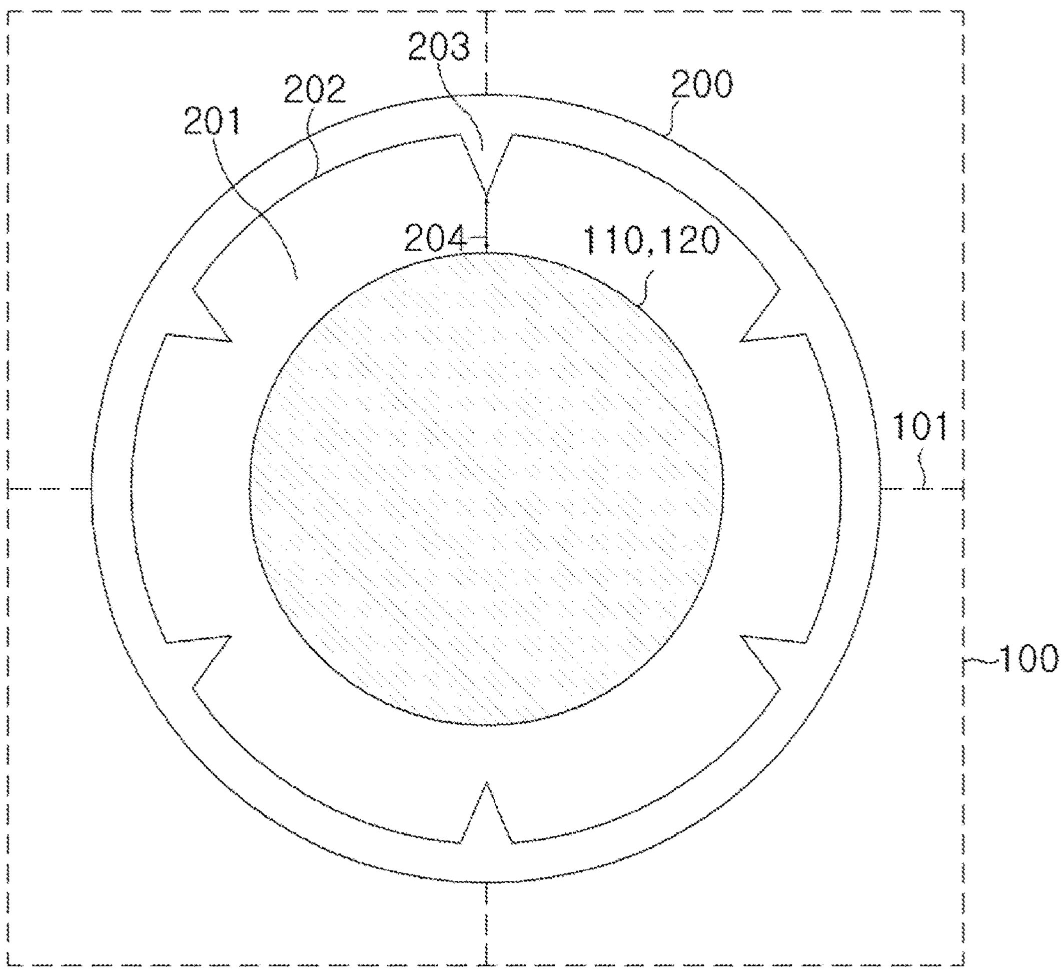
FIG. 3 is a front view of an induction ring according to an embodiment of the present invention.

FIG. 1 is a schematic circuit diagram of a superconducting arcing induction type DC circuit breaker system according to an embodiment of the present invention, FIGS. 2A to 2D are diagrams of an arcing induction type DC circuit breaker (hereinafter, simply referred to as a DC circuit breaker) according to an embodiment of the present invention, and FIG. 3 is a front view of an induction ring according to an embodiment of the present invention.

The superconducting arcing induction type DC circuit breaker system 10 according to an embodiment of the present invention includes a power source 11 configured to supply DC power, an input power switch 12, a line resistance 13, a current transformer (CT) 14, a switching controller relay 15, a superconducting fault current limiter 16, a fault switch 17, and a DC circuit breaker 100. The superconducting fault current limiter 16 and the DC circuit breaker 100 constitute a superconducting arcing induction type DC circuit breaker (hereinafter, simply referred to as a superconducting DC circuit breaker) 130.

In the superconducting arcing induction type DC circuit breaker system 10, when DC power is supplied through the input power switch 12, a current is normally applied to a load 18 along a line.

The current transformer 14 is electrically connected to the power source 11, the switching controller relay 15, and the DC circuit breaker 100. The current transformer 14 detects a variation of a current flowing through the line resistance 13 and determines occurrence or non-occurrence of a fault current.

The switching controller relay 15 is electrically connected to the current transformer 14 and the DC circuit breaker 100. When the switching controller relay 15 receives a control signal from the current transformer 14, the switching controller relay 15 controls the DC circuit breaker 100 to instantaneously operate without delay.

An induction needle 203 is disposed adjacent to a mechanical contact of the DC circuit breaker 100 and configured to induce or absorb arc upon contact opening.

An induction ring 200 is connected to a ground line 24 and configured to collect arc induced by the induction needle 203 and quench the collected arc through the ground line 24.

The superconducting fault current limiter 16 is a device configured to perform no interruption when a current below a threshold current flows and to generate a resistance for itself when a current above the threshold current flows. The superconducting fault current limiter 16 is electrically connected in series to one end of the DC circuit breaker 100. When the fault current flows through the line before the fault current is induced to the induction needle 203, the superconducting fault current limiter 16 functions to limit most fault current.

The superconducting fault current limiter 16 limits an initial fault current within a half period, so that the initial fault current is limited before the contact opening of the DC circuit breaker 100, thereby reducing the magnitude of the arc generated upon the contact opening of the DC circuit breaker 100.

When a simulated accident occurs due to an on operation, the fault switch 17 may detect the occurrence of the simulated accident and divide a flow of a fault current into two paths at the same time as the opening of the mechanical contact (an anode 110 and a cathode 120) of the DC circuit breaker 100.

The two paths are most fault current flowing through the line after the opening of the anode 110 and the cathode 120 of the DC circuit breaker 100 and partial fault current induced to the induction needle 203 and flowing through the ground line 24.

The most fault current flowing through the line is quenched by the superconducting fault current limiter 16, and the partial fault current flowing through the induction needle 203 is quenched while flowing through the ground line 24.

When the fault current is sensed by the current transformer 14, the DC circuit breaker 100 blocks the flow of the current by opening the mechanical contact. When the fault current is sensed, the DC circuit breaker 100 instantaneously operates without delay due to the operation of the switching controller relay 15.

In the description of FIG. 1 the induction ring 200, induction needle 203, anode 110, cathode 120 are mentioned, refer to those depicted in FIG. 2A.

A configuration of the DC circuit breaker 100 and the induction ring 200 will be described in detail with reference to FIGS. 2A, 2B, 2C, 2D, and 3.

FIGS. 2A to 2D described above illustrate arc extinction after the contact between the anode 110 and the cathode 120 of the DC circuit breaker 100 are opened.

The induction ring 200 has six induction needles 203. Referring to FIG. 2B, the arc is generated while the contact between the anode 110 and the cathode 120 is opened. Referring to FIG. 2C, the arc is distributed and induced to the six induction needles 203 from a time point at which the contact distance 205 between the anode 110 and the cathode 120 becomes longer than the induction interval 204. Subsequently, referring to FIG. 2D, the anode 110 and the cathode 120 of the DC circuit breaker 100 are completely separated from each other to block the flow of the current.

Any other labels that are mentioned in the description of FIGS. 2A to 2D refer to the figure in which the labels appear.

The DC circuit breaker 100 according to an embodiment of the present invention is provided between the power source 11 and the load 18 and includes the anode 110 that is a cylindrical conductor, a first support 112 that supports the anode 110, the cathode 120 that is a cylindrical conductor, and the second support 122 that supports the cathode 120.

In order to block the flow of the fault current, the DC circuit breaker 100 blocks the flow of the current by separating the anode 110 and the cathode 120 that are in contact with each other. Since the mechanical structure in which the anode 110 and the cathode 120 of the DC circuit breaker 100 are separated from each other and come into contact with each other is a known technology, a detailed description of components thereof will be omitted.

Referring to FIG. 3, the DC circuit breaker 100 according to an embodiment of the present invention includes the induction ring 200 that has a through-hole 201, is continuously formed in a 360-degree direction, has a certain shape and thickness, and is made of a conductor material, and the induction needle 203 that protrudes from the inner surface of the induction ring 200 toward the center of the induction ring 200.

The induction ring 200 may be formed to have a ring shape, may have a diameter larger than that of the anode 110 and the cathode 120 of the DC circuit breaker 100, and if necessary, may be formed to have a polygonal shape such as a rectangular shape or a triangular shape. Since the induction ring 200 may be formed to have not a ring shape but a polygonal shape, the induction ring 200 may also be referred to as an induction member.

A contact point where the anode 110 and the cathode 120 approach from opposite directions and come into contact with each other is formed in the through-hole 201 of the induction ring 200, and the anode 110 and the cathode 120 are separated in a direction far away from each other.

The induction ring 200 has one side connected to the ground line 24 and is fixed to one inner side of the DC circuit breaker 100 by a coupling member 101.

The induction ring 200 is spaced a certain distance from the contact point where the anode 110 and the cathode 120 come into contact with each other, and surrounds the anode 110 and the cathode 120.

The induction needle 203 may be provided in plurality along the inner surface 202 of the induction ring 200 at regular intervals. Arc may be decomposed and absorbed in a different manner according to the number of induction needles 203. Two induction needles 203 are preferable.

By using a lightning arrester, the induction needle 203 is formed to have a conical shape such that a curvature radius thereof is gradually reduced toward the center of the induction ring 200.

It has been described that one end of the induction needle 203 is pointed, but embodiments of the present invention are not limited thereto. One end of the induction needle 203 may be gently curved.

When the DC circuit breaker 100 receives an operation control signal from the switching controller relay 15, the anode 110 and the cathode 120 that are in contact with each other are separated from each other.

Current arc is generated when the anode 110 and the cathode 120 are separated from each other. At this time, the induction needle 203 absorbs or induces arc generated when the contact is opened, that is, when the anode 110 and the cathode 120 are separated from each other in the event of system accident of DC power or AC power.

The induction ring 200 collects arc induced by the induction needle 203 and quenches the collected arc through the ground line 24.

FIGS. 4A to 4D are diagrams for describing the concept of the arcing induction according to an embodiment of the present invention.

Figure 4A:
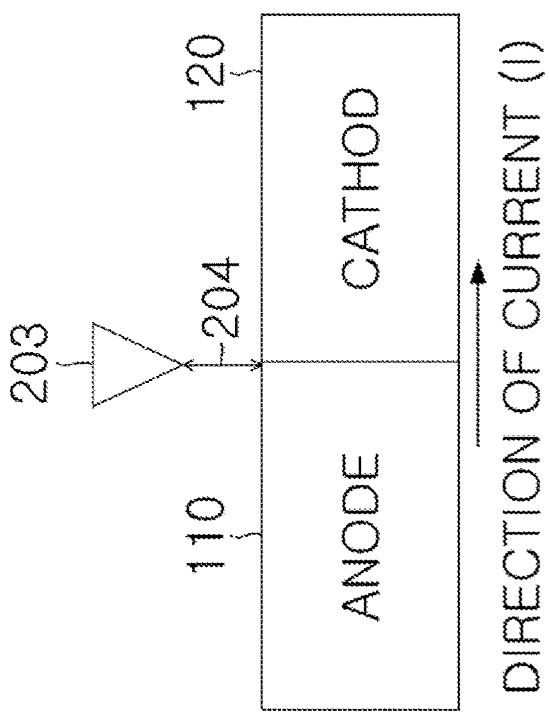
FIGS. 4A to 4D are diagrams for describing a concept of arcing induction according to an embodiment of the present invention.
Figure 4B:
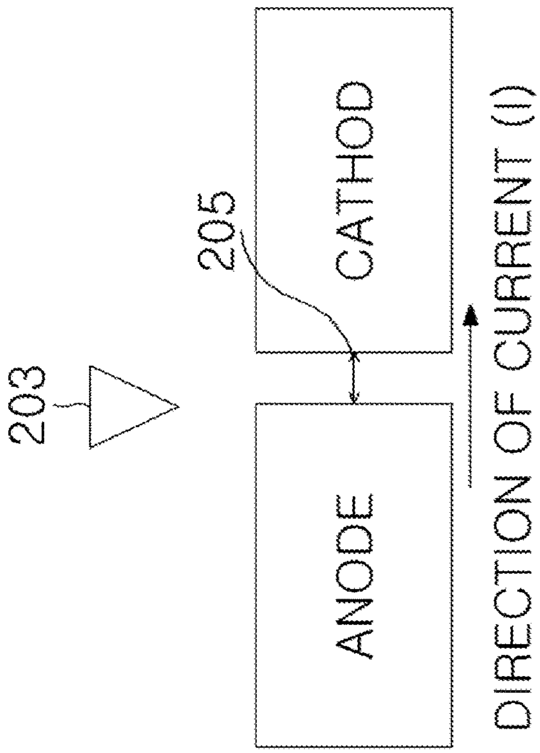

FIG. 4A illustrates a situation in which the anode 110 and the cathode 120 of the DC circuit breaker 100 are in contact with each other. FIG. 4B illustrates a situation in which a contact distance 205 between the anode 110 and the cathode 120 is shorter than an induction interval 204.

Referring to FIG. 4B, when the anode 110 and the cathode 120 of the DC circuit breaker 100 operate and start to be separated from each other, a current flowing between the anode 110 and the cathode 120 causes the generation of a switching surge and an ignition occurs between the anode 110 and the cathode 120.

The induction interval 204 represents a distance between one end of the induction needle 203 and the anode 110.

After the situation of FIG. 4B, as the contact distance 205 between the anode 110 and the cathode 120 increases, intensity of arc gradually increases.

Figure 4D:
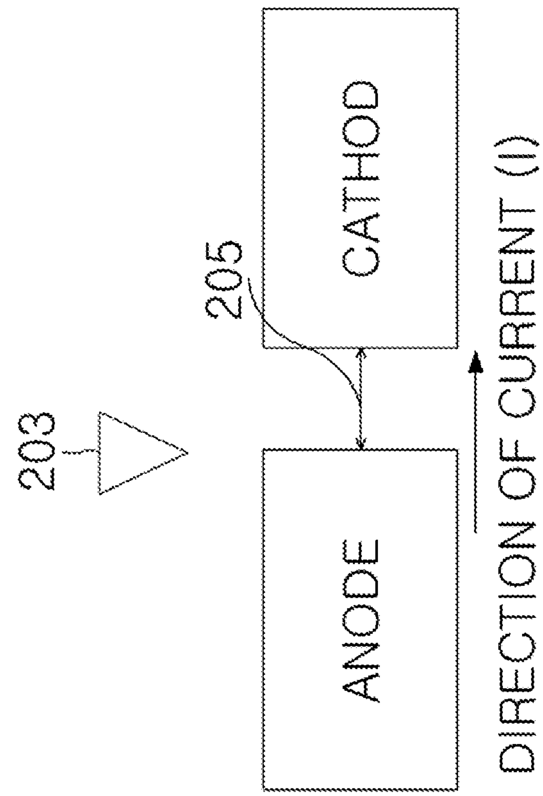
Figure 4C:
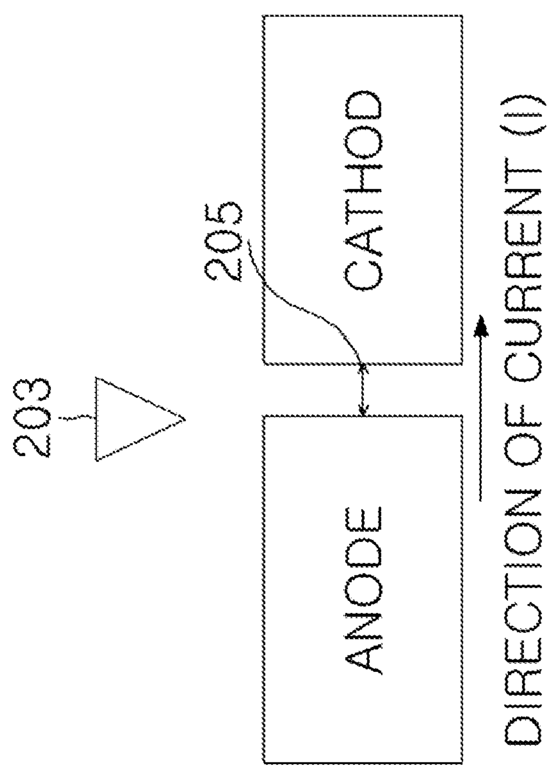

FIG. 4C illustrates a situation in which the contact distance 205 between the anode 110 and the cathode 120 is equal to the induction interval 204, and FIG. 4D illustrates a situation in which the contact distance 205 between the anode 110 and the cathode 120 is longer than the induction interval 204. Referring to FIG. 4C, the arc starts to be induced to the pointed induction needle 203 of the induction ring 200.

The principle of the arcing induction can be analyzed by Coulomb's law, and a force inversely proportional to the square of the distance is applied based on Coulomb's law:

$$F \times \frac{1}{4\pi\varepsilon_0} \times \frac{q_1 q_2}{r^2}$$

Referring to FIG. 4D, when the contact distance 205 between the anode 110 and the cathode 120 is longer than the induction interval 204, arc is generated between the anode 110 and the induction needle 203 of the induction ring 200 according to Coulomb's law. This phenomenon appears as the induction of the arc to the induction needle 203 of the induction ring 200.

Any other labels that are mentioned in the description of FIGS. 4A to 4D refer to the figure in which the labels appear.

FIGS. 5A to 5D and 6A to 6D are diagrams for comparison of travelling directions of arc generated by the contact opening of the DC circuit breaker 100 according to the number of induction needles, according to an embodiment of the present invention.

The induction ring 200 illustrated in FIGS. 5A to 5D has one induction needle 203, and the induction ring 200 illustrated in FIGS. 6A to 6D has two induction needles 203.

FIGS. 5A to 5D and 6A to 6D illustrate the progressing situations of the arc generated while the anode 110 and the cathode 120 of the DC circuit breaker 100 are separated in the order of A, B, C, and D.

Figure 5A:
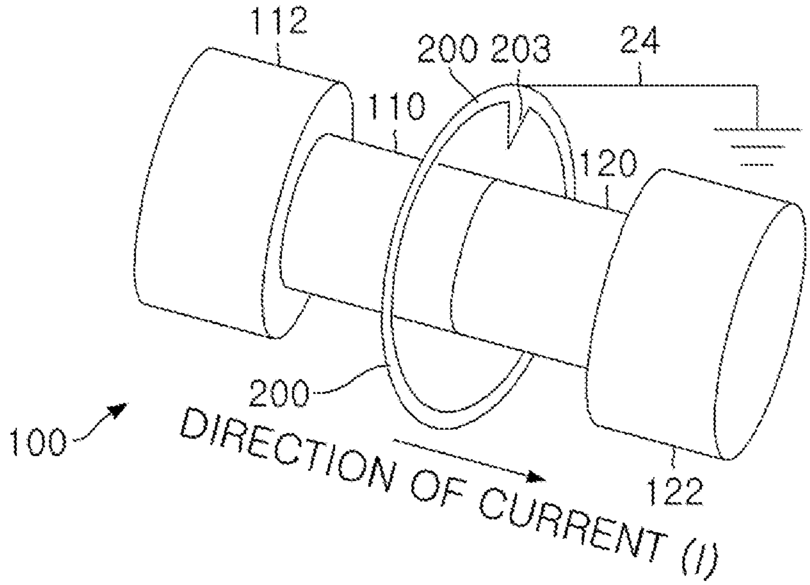
FIGS. 5A to 5D and 6A to 6D are diagrams for comparison of travelling directions of arc generated by contact opening of the arcing induction type DC circuit breaker according to the number of induction needles, according to an embodiment of the present invention.
Figure 5B:
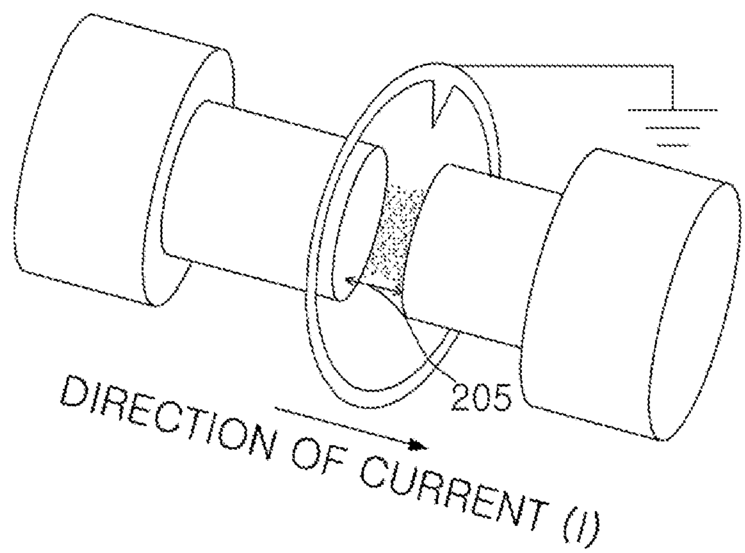
Figure 5C:
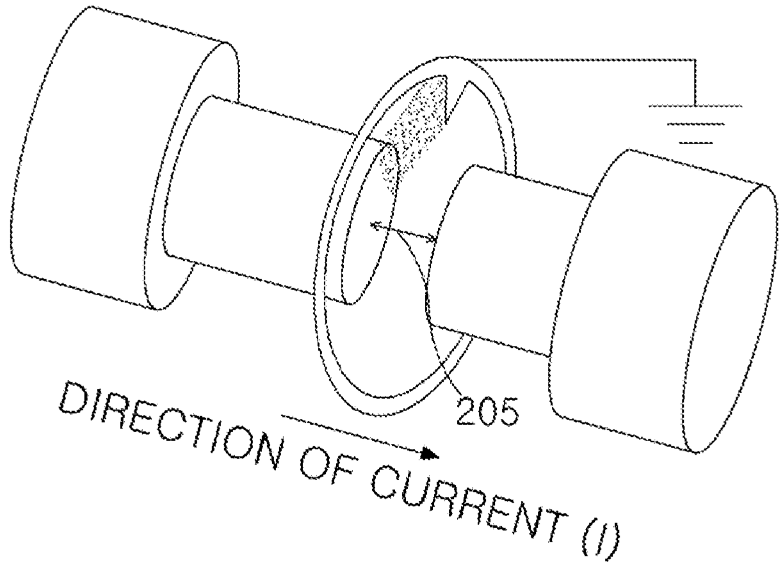
Figure 5D:
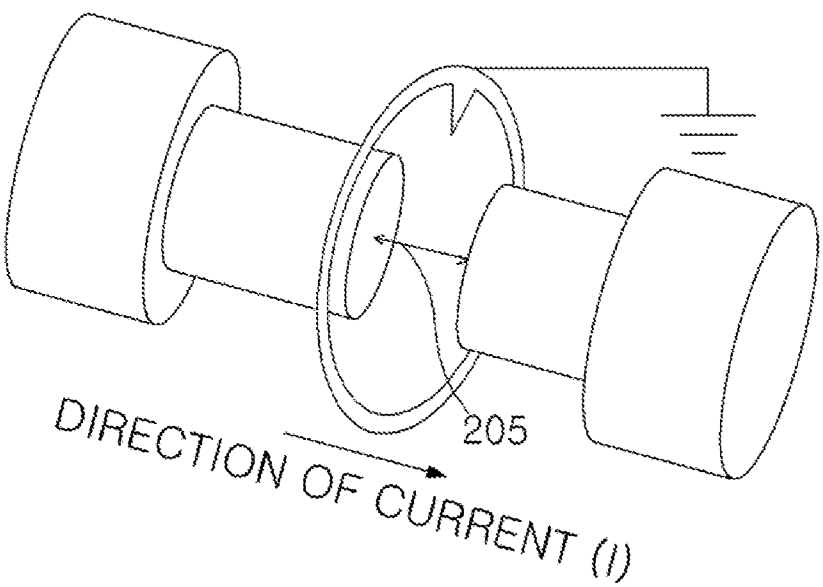

Referring to FIG. 5B, the arc is generated while the anode 110 and the cathode 120 are separated from each other. Referring to FIG. 5C, the arc from one induction needle 203 is concentratedly flows from a time point at which the contact distance 205 between the anode 110 and the cathode 120 becomes longer than the induction interval 204. Subsequently, referring to FIG. 5D, the anode 110 and the cathode 120 of the DC circuit breaker 100 are completely separated from each other to block the flow of the current.

Figure 6A:
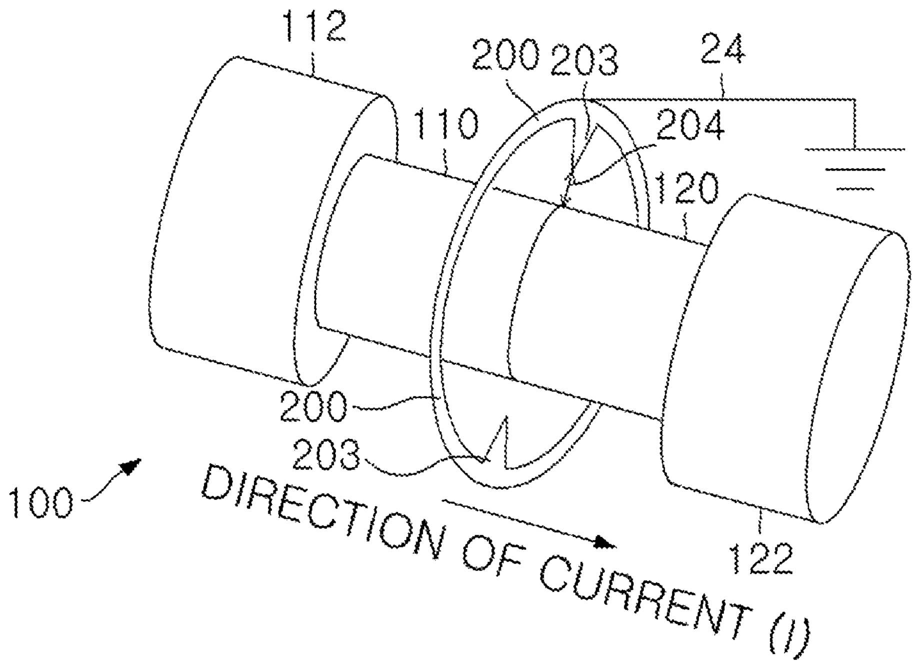
Figure 6B:
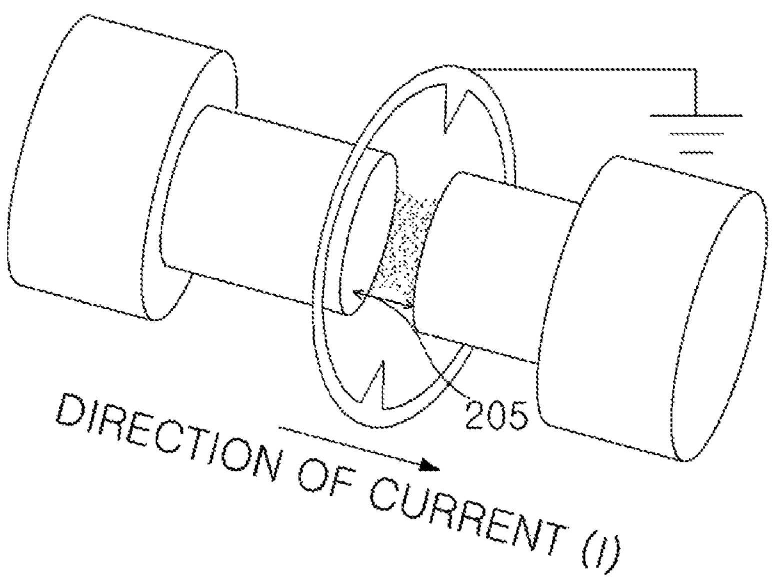
Figure 6C:
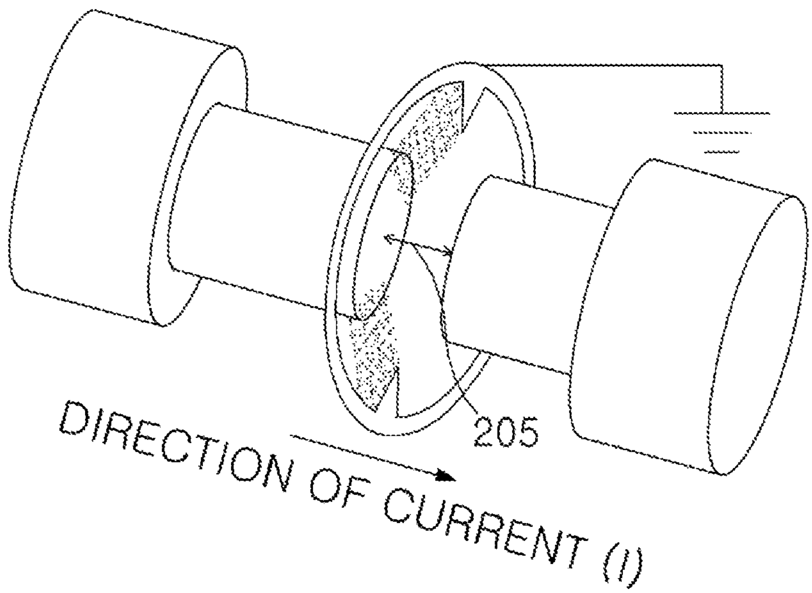
Figure 6D:
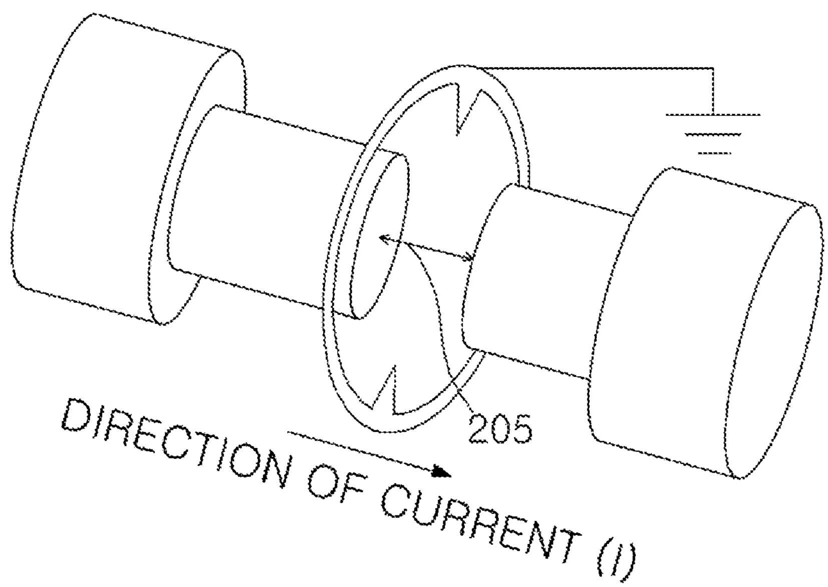

Referring to FIG. 6B, the arc is generated while the anode 110 and the cathode 120 are separated from each other. Referring to FIG. 6C, the arc is distributed to two induction needles 203 and then flows therethrough from a time point at which the contact distance 205 between the anode 110 and the cathode 120 becomes longer than the induction interval 204. Subsequently, referring to FIG. 6D, the anode 110 and the cathode 120 of the DC circuit breaker 100 are completely separated from each other.

Any other labels that are mentioned in the description of FIGS. 5A to 5D and 6A to 6D refer to the figure in which the labels appear.

The induction ring 200 according to the embodiment of the present invention is applied to the system accident of the DC power, but embodiments of the present invention are not limited thereto. The induction ring 200 may also be applied to the system accident of the AC power.

According to one or more embodiments described above, the arc current applied to the line upon the mechanical contact opening of the DC circuit breaker is induced by the induction needle, passes through the induction ring, and quenched by the flow to the ground through the ground line, thereby preventing the fault current accident.

Before the arc current is induced and quenched by the DC circuit breaker, the superconducting unit may be used to limit most fault current flowing through the main line within a half period.

According to one or more embodiments of the present invention, since the arc generated in the contact upon mechanical contact opening of the DC circuit breaker is induced to the ground line by the induction ring, mechanical contact damage and abrasion may be reduced in fault current breaking and the breaking time may also be reduced.

According to one or more embodiments, since the DC circuit breaker is implemented by combining the induction ring and the superconducting unit, it is possible to minimize damage generated when the arc of the DC circuit breaker is quenched, thereby securing stable operation characteristics of the DC circuit breaker and a high-reliability fault current breaking effect. Consequently, the power system may be protected and the supply of DC systems may be expanded.

The above-mentioned embodiments of the present invention are not embodied only by an apparatus and/or method. Alternatively, the above-mentioned embodiments may be embodied by a program for performing functions corresponding to the configuration of the embodiments of the present invention, or a recording medium on which the program is recorded. These embodiments can be easily carried out from the description of the above-mentioned embodiments by those skilled in the art to which the present invention pertains.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

DESCRIPTION OF REFERENCE NUMERALS

- 10: superconducting arcing induction type DC circuit breaker system
- 11: power source
- 12: input power switch
- 13: line resistance
- 14: current transformer
- 15: switching controller relay
- 16: superconducting fault current limiter
- 17: fault switch
- 18: load
- 24: ground line
- 25: ground terminal
- 100: DC circuit breaker
- 101: coupling member
- 110: anode
- 112: first support
- 120: cathode
- 122: second support
- 130: superconducting DC circuit breaker
- 200: induction ring
- 201: through-hole
- 202: inner surface
- 203: induction needle
- 204: induction interval
- 205: contact distance

What is claimed is:

1. A superconducting arcing induction type DC circuit breaker comprising:

a superconducting fault current limiter configured to perform a quenching operation at a speed of a half period or less in the event of line accident; and an arcing induction type DC circuit breaker including an induction member that has a through-hole, is continuously formed in a 360-degree direction, has a certain shape and thickness, and is made of a conductor material, and an induction needle that protrudes from an inner surface of the induction member toward a center of the induction member, wherein a contact point where an anode and a cathode, which are mechanical contacts, approach from opposite directions and come into contact with each other is formed in the through-hole of the induction member, and the anode and the cathode are separated in a direction far away from each other, the induction needle induces arc generated upon contact opening when the anode and the cathode are separated from each other in the event of system accident of a DC power or an AC power, and the induction member quenches the induced arc by the flow of the induced arc to ground through a ground line.

2. The superconducting arcing induction type DC circuit breaker of claim 1, wherein the induction needle is provided in plurality at regular intervals along the inner surface of the induction member, has a curvature radius gradually reduced toward a center of the induction member, and absorbs or induces arc generated at a contact between the anode and the cathode.

3. The superconducting arcing induction type DC circuit breaker of claim 1, wherein the induction member is formed to have a ring shape or a polygonal shape.

4. The superconducting arcing induction type DC circuit breaker of claim 1, wherein the superconducting fault current limiter is electrically connected in series to the arcing induction type DC circuit breaker and configured to limit a fault current flowing through a line before the fault current is induced to the induction member.

5. The superconducting arcing induction type DC circuit breaker of claim 1, wherein the induction needle has a curvature radius gradually reduced toward the center of the induction member, so that the induction needle is pointed, and the induction member is disposed in a direction perpendicular to a moving direction of the anode and the cathode.

6. The superconducting arcing induction type DC circuit breaker of claim 1, wherein an induction ring and the induction needle are made of a conductor that has a small electrical resistance with respect to an electrical conduction.

* * * * *